United States Patent
Marioni

(10) Patent No.: US 9,088,236 B2
(45) Date of Patent: Jul. 21, 2015

(54) METHOD FOR CONTROLLING A PERMANENT MAGNET SYNCHRONOUS ELECTRIC MOTOR AT STEADY-STATE, ELECTRONIC DEVICE FOR IMPLEMENTING SAID METHOD AND MOTOR ASSEMBLY COMPRISING SAID ELECTRONIC DEVICE

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 235 days.

(21) Appl. No.: 13/188,582

(22) Filed: Jul. 22, 2011

(65) Prior Publication Data

US 2012/0019187 A1    Jan. 26, 2012

(30) Foreign Application Priority Data

Jul. 23, 2010  (EP) .................................... 10425251

(51) Int. Cl.
| | |
|---|---|
| *H02P 3/18* | (2006.01) |
| *H02P 6/00* | (2006.01) |
| *H02P 6/18* | (2006.01) |
| *H02P 27/16* | (2006.01) |

(52) U.S. Cl.
CPC ................ *H02P 6/182* (2013.01); *H02P 6/008* (2013.01); *H02P 27/16* (2013.01)

(58) Field of Classification Search
USPC ............ 318/400.11, 434, 474, 721, 807, 627, 318/716, 717, 727, 400.02
See application file for complete search history.

(56) References Cited

U.S. PATENT DOCUMENTS

| | | | | |
|---|---|---|---|---|
| 4,544,868 A | * | 10/1985 | Murty ..................... | 318/400.11 |
| 4,565,956 A | * | 1/1986 | Zimmermann et al. ...... | 318/721 |
| 5,142,214 A | * | 8/1992 | Purson et al. ................. | 318/722 |
| 5,510,689 A | * | 4/1996 | Lipo et al. ..................... | 318/809 |
| 6,208,113 B1 | * | 3/2001 | Lelkes et al. .................. | 318/807 |
| 6,462,492 B1 | * | 10/2002 | Sakamoto et al. ........ | 318/400.32 |
| 6,768,280 B2 | * | 7/2004 | Kitajima ...................... | 318/432 |
| 7,463,005 B2 | * | 12/2008 | Iura et al. ...................... | 318/727 |
| 7,958,584 B2 | * | 6/2011 | Suel et al. .......................... | 8/158 |
| 2001/0011877 A1 | * | 8/2001 | Lelkes et al. .................. | 318/700 |
| 2003/0001536 A1 | * | 1/2003 | Kitajima ...................... | 318/629 |
| 2003/0230999 A1 | * | 12/2003 | de Nanclares et al. ........ | 318/716 |
| 2004/0145336 A1 | * | 7/2004 | Marioni ....................... | 318/717 |
| 2006/0055352 A1 | * | 3/2006 | Mori et al. .................... | 318/432 |
| 2007/0114957 A1 | | 5/2007 | Aarestrup | |
| 2007/0176567 A1 | * | 8/2007 | Maeda .......................... | 318/254 |
| 2007/0194731 A1 | * | 8/2007 | Fukamizu et al. ............. | 318/254 |
| 2007/0210732 A1 | * | 9/2007 | Bosch et al. ................... | 318/254 |
| 2008/0100243 A1 | * | 5/2008 | Kurosawa et al. ............. | 318/430 |
| 2009/0205377 A1 | * | 8/2009 | Suel et al. ..................... | 68/12.04 |

(Continued)

FOREIGN PATENT DOCUMENTS

| | | |
|---|---|---|
| EP | 0574823 A2 | 12/1993 |
| WO | 2005/025050 A1 | 3/2005 |

*Primary Examiner* — Paul Ip
(74) *Attorney, Agent, or Firm* — Akerman LLP

(57) ABSTRACT

A method, which is efficient and cost-effective to implement, for controlling, at steady-state, a synchronous electric motor comprising a permanent magnet rotor and a stator provided with windings connected to an electrical grid by means of a switch controlled by a processing unit, said method comprising the following steps: periodically switching on said switch by means of a PWM output of said processing unit; continuously verifying the shift with respect to an ideal operating condition of the motor; and modifying the switched on period of the switch in feedback to approach said ideal operating condition of the motor.

13 Claims, 6 Drawing Sheets

(56) References Cited

U.S. PATENT DOCUMENTS

2010/0066284 A1* 3/2010 Iwaji et al. .............. 318/400.02
2010/0188037 A1   7/2010 Acquaviva et al.
2010/0320956 A1* 12/2010 Lumsden et al. ............ 318/799
2011/0080130 A1*  4/2011 Venkataraman ............ 318/474
2012/0213645 A1*  8/2012 Lumsden et al. ............ 417/44.1

* cited by examiner

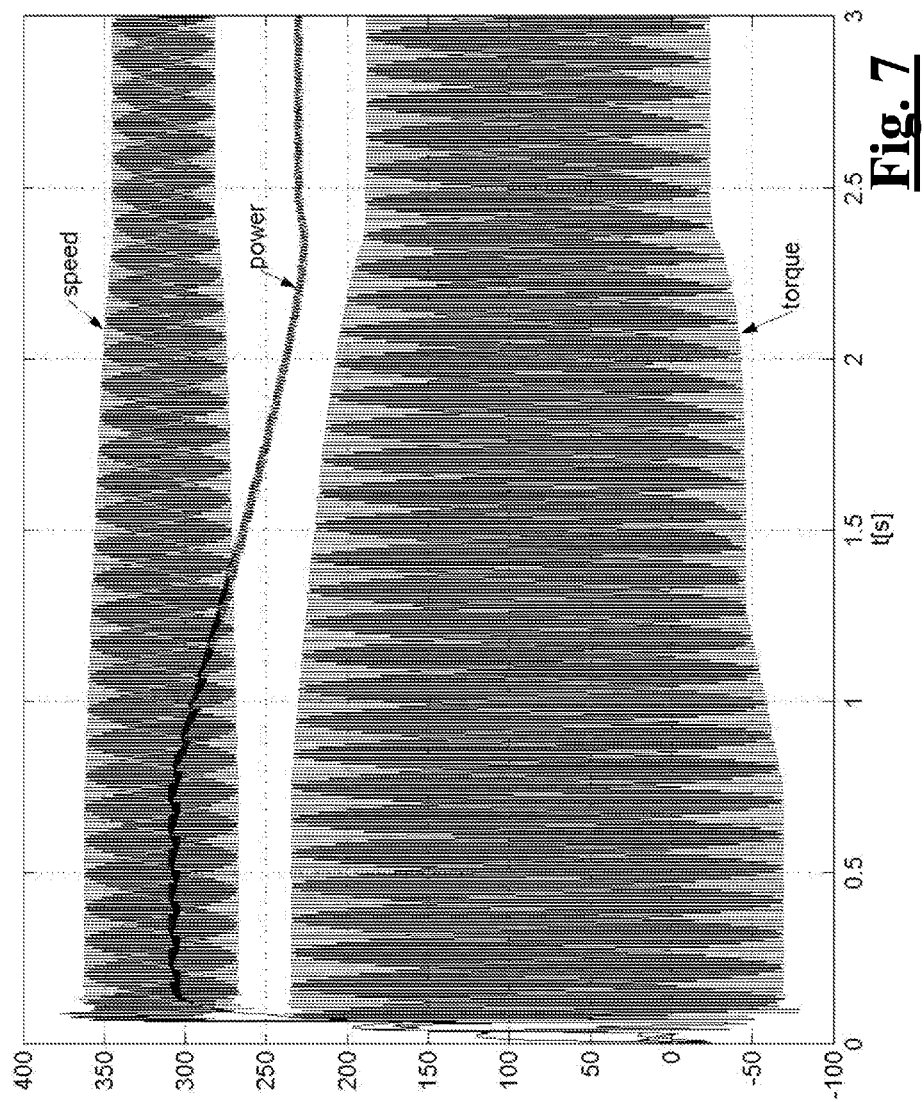

METHOD FOR CONTROLLING A PERMANENT MAGNET SYNCHRONOUS ELECTRIC MOTOR AT STEADY-STATE, ELECTRONIC DEVICE FOR IMPLEMENTING SAID METHOD AND MOTOR ASSEMBLY COMPRISING SAID ELECTRONIC DEVICE

CROSS-REFERENCE TO RELATED APPLICATIONS

The present application claims priority to European Patent Application No. 10425251.5, filed Jul. 23, 2010, the entirety of which is incorporated herein by reference.

Field of Application

The present invention refers, in its most general aspect, to a method for controlling, at steady-state, a permanent magnet synchronous electric motor as well as to an electronic device able to be associated with an electric motor for implementing said starting method. The invention also refers to the motor assembly comprising said electronic device.

In particular, the method concerns controlling, at steady-state, synchronous electric motors used in applications characterised by a great need to reduce cost and bulk. For example, it concerns the control of electric motors, generally of the permanent magnet single-phase type, used in domestic appliances such as washing machines and dishwashers.

Prior Art

Synchronous motors are widely used in a wide range of different applications, in virtue of a high energy efficiency and an excellent stability of the steady-state.

Only relatively recently, however, with the development of low-cost technical solutions to the problem of starting such motors, have they also been adopted for applications that require compact and low-cost machines, like for example for discharge pumps or washing pumps of washing machine and dishwashers.

In this type of application it is preferable to use permanent magnet synchronous motors, generally of the single-phase or two-phase type, managed by low-cost control electronics.

Such control electronics are generally limited to managing the starting and stopping of the motor, also detecting possible shutdown or overheating conditions; in operation at normal speed the motor is thus self-regulated.

Such a solution has various drawbacks, the most serious of which are the lack of energy optimisation of the motor in the various conditions of use and the high operating noise due to vibrations.

Other problems can derive from the limited stability of the motor, which is unsuitable for responding to rapid variations in load, or to the demagnetization of the permanent magnet due to the stator magnetic field.

On the other hand more elaborate control circuits, like those with an inverter that generally control three-phase synchronous machines, have excessive costs for the applications identified above.

The technical problem forming the basis of the present invention is, therefore, to devise a method for controlling, at steady-state, a permanent magnet synchronous motor and a respective electronic device for implementing it that allow the energy optimisation of the motor, without affecting the production and installation costs excessively.

SUMMARY OF THE INVENTION

The aforementioned technical problem is solved by a method for controlling, at steady-state, a synchronous electric motor comprising a permanent magnet rotor and a stator provided with windings connected to an electrical grid by means of a switch controlled by a processing unit, said method comprising the following steps:
- periodically switching on said switch by means of a PWM output of said processing unit;
- continuously verifying the shift with respect to an ideal operating condition of the motor;
- modifying the switched on period of the switch in feedback to get closer to said ideal operating condition of the motor.

The method described above solves the problem of controlling the motor efficiently and cost-effectively.

Moreover, the use of a PWM port rather than a normal logic port allows excellent time resolution of the control in feedback, ensuring stability of operation of the synchronous motor.

It should also be noted how the method is particularly suitable for controlling a single-phase or two-phase permanent magnet synchronous motor.

The ideal operating condition occurs when the counter electromotive force signal generated by the synchronous motor changes sign as the middle point of a zero current plateau of the current function, i.e. when the counter electromotive force is phased with the supply current to the windings. Such a condition ensures the energy optimisation of the motor and can also be implemented in sensorless mode, given that the profile of the counter electromotive force signal can be obtained as the difference between the electrical grid voltage and the voltage across the switch in the periods in which the current fed to the windings is zero.

Alternatively, it is possible to consider a sensored mode to implement the present method, in which the ideal operating condition of the motor is that the load angle $\delta$ takes up a reference value $\delta_{opt}$ (calculated so as to obtain the energy optimisation and consequently a substantial reduction of the vibrations of the motor).

Such a condition can be implemented by measuring a delay between the front of a position signal of the rotor (acquired by a suitable position sensor) and a grid synchronisation signal: such a delay is indeed representative of the load angle of the motor.

Advantageously, the timer for controlling the PWM output can be synchronised with a voltage signal of the electrical grid.

The aforementioned technical problem is also solved by an electronic device for controlling, at steady-state, a synchronous motor comprising a processing unit equipped with a PWM output and a switch for feeding said synchronous motor controlled by said PWM output, said processing unit being arranged to periodically switch on said switch by modifying the switched on period in feedback to get closer to an ideal operating condition of the synchronous motor.

The electronic device can implement a sensorless control, in which case the processing unit receives a grid voltage signal and a voltage signal across the switch and it is arranged to calculate the counter electromotive force generated by the synchronous motor from said signals.

Alternatively, the electronic device can implement a sensored control, in which case it comprises a position sensor intended to obtain a position signal of a rotor of the synchronous motor and send said signal to the processing unit. The processing unit will then be arranged to obtain a value representative of the load angle δ of the synchronous motor from said signal.

The switch can advantageously be a TRIAC switch, whereas the electronic device can comprise a portion for the synchronisation with the grid of the timer for controlling the PWM output.

Also forming the object of the present invention is a motor assembly comprising a single-phase synchronous electric motor using permanent magnets and an electronic device of the type described above.

Further characteristics and advantages of the present invention will become clear from the following description of two preferred embodiments given for indicating and not limiting purposes with reference to the attached drawings.

BRIEF DESCRIPTION OF THE DRAWINGS

FIG. 7 shows the time profile of some parameters relative to the synchronous motor of FIG. 1 during the control at steady-state carried out with the method of FIG. 4.

DETAILED DESCRIPTION

Figure 1:
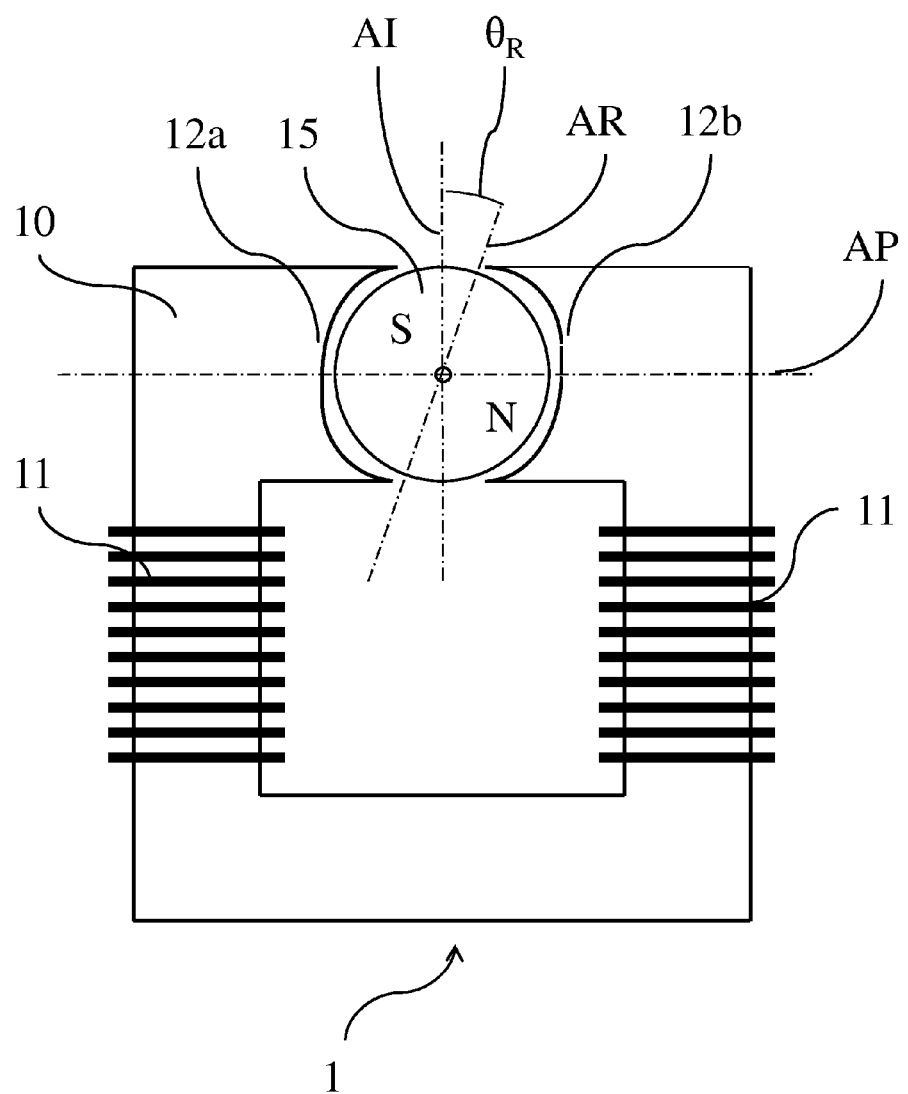
FIG. 1 schematically represents a synchronous electric motor controlled with a starting logic according to the present invention.

With reference to the attached FIG. 1, reference numeral 1 identifies a single-phase synchronous motor using permanent magnets, comprising a stator 10 and a cylindrical rotor 15 able to rotate with respect to it.

The stator 10 defines a magnetic circuit that closes on the stator 15, rotatably arranged between a first 12a and a second 12b polar expansion of the stator itself. The stator has two windings 11 fed by an electronic device 20.

The rotor 15 comprises a permanent magnet arranged so as to define two diametrically opposite magnetic poles on the outer periphery of the element. We shall use the term rotor axis AR to identify a diameter of the rotor lying on the ideal plane of separation between the poles thus defined.

The polar expansions 12a, 12b, arranged according to a polar axis AP of the stator 10, are distinguished by a morphological asymmetry, so that the rotor 15 at rest is arranged with rotor axis AR inclined by an angle of asymmetry $\theta_R$ with respect to an interpolar axis AI of the stator 10. Such asymmetry, as known, ensures the unidirectional starting of the synchronous motor. In the present example the rotor axis AR is inclined by about 6° with respect to the interpolar axis AI, thus promoting starting of the rotor in the same direction.

Figure 2:
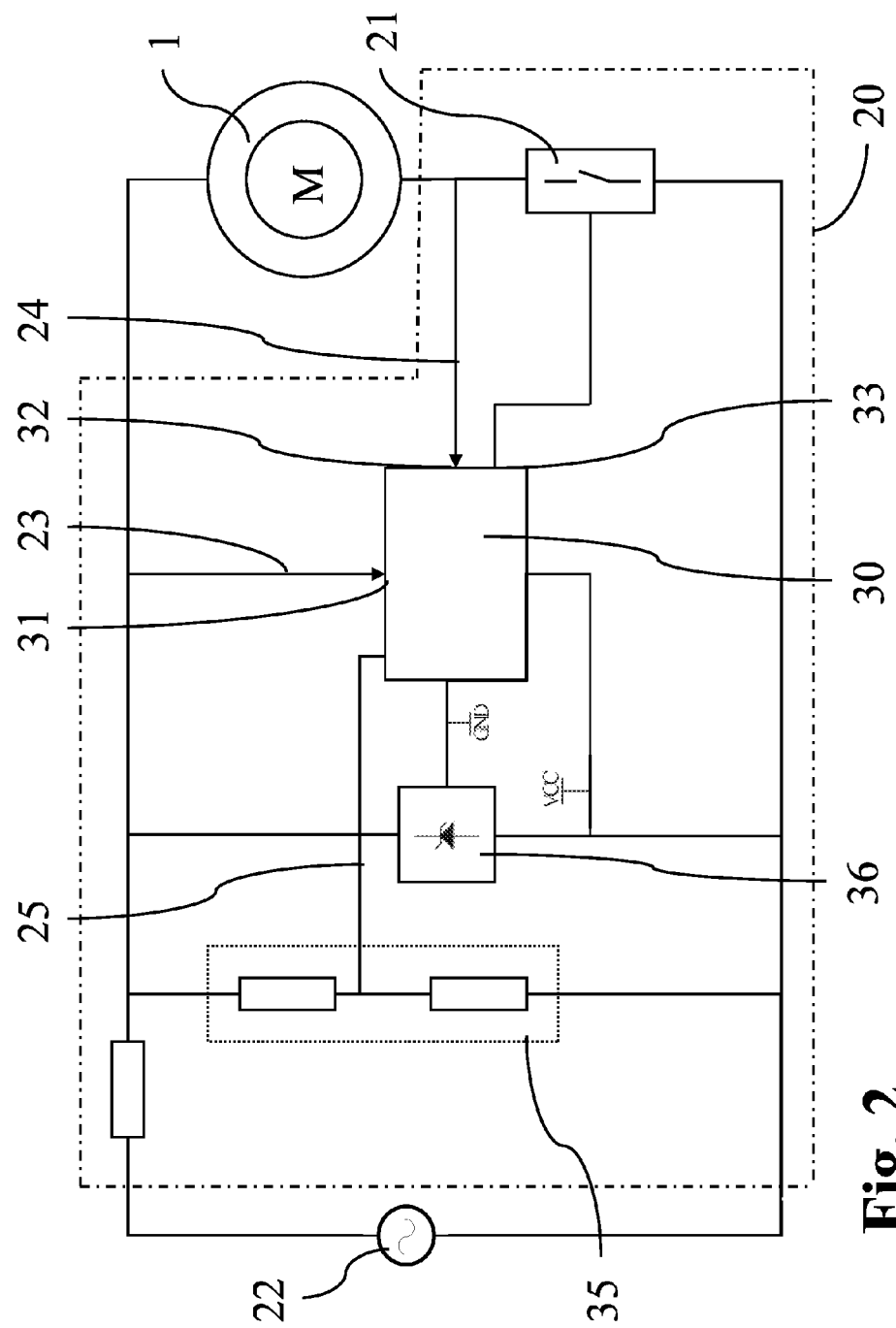
FIG. 2 schematically represents an electronic device according to a first embodiment of the present invention applied to the synchronous electric motor of FIG. 1.
Figure 3:
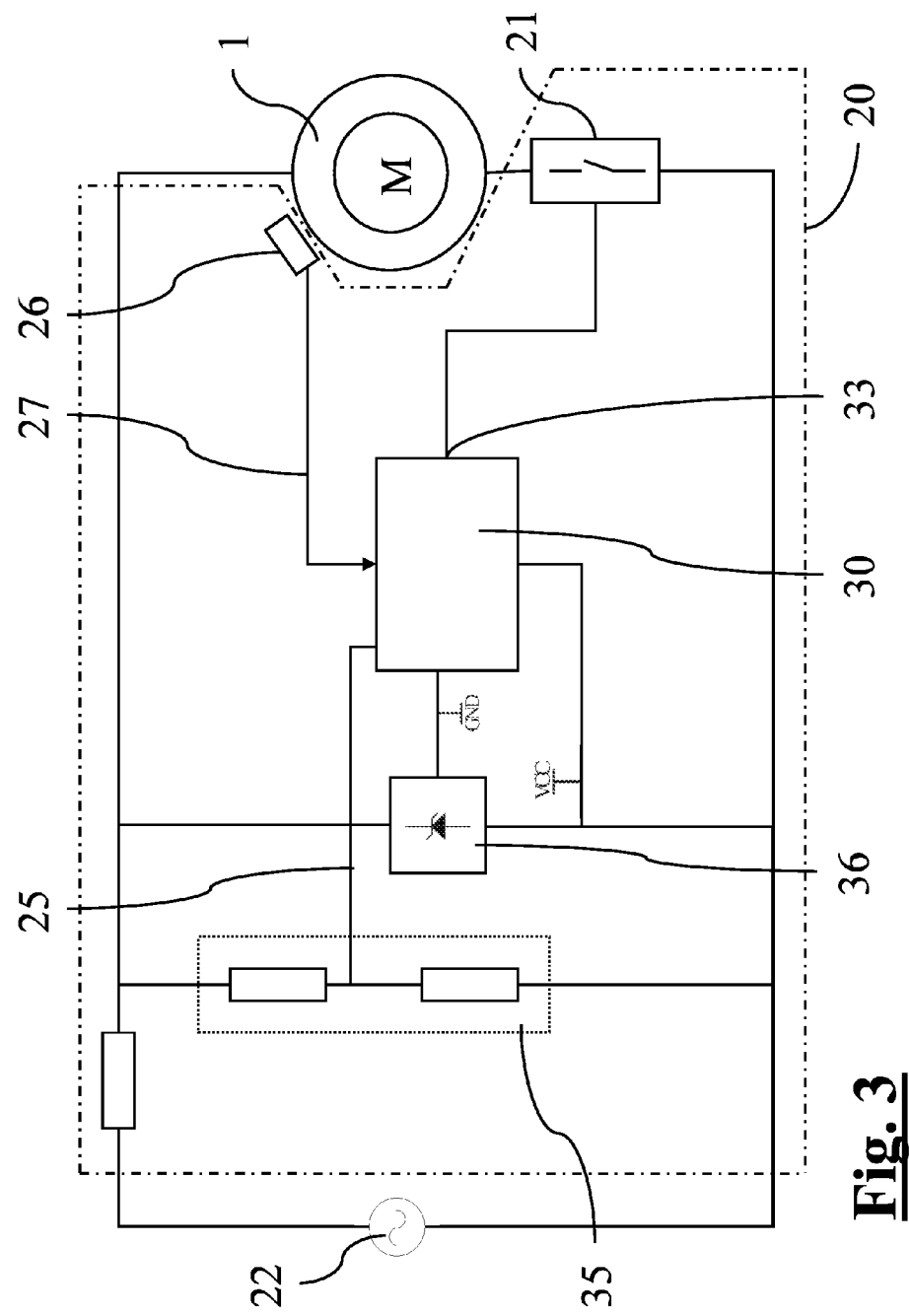
FIG. 3 schematically represents an electronic device according to a second embodiment of the present invention applied to the synchronous electric motor of FIG. 1.

The electronic device 20, which preferably takes up the form of a control board, can be made according to a first embodiment illustrated in FIG. 2 or a second embodiment visible in FIG. 3. For the sake of greater clarity of presentation, in the two figures, similar elements have been indicated with the same reference numeral.

The electronic devices 20 according to both the embodiments have a static switch 21, in this specific case a TRIAC switch, arranged to adjust the power supply to the stator windings 11, supplied by an electrical grid 22 in alternating current.

The TRIAC switch 21 is connected to a PWM output 33 of a processing unit 30, which preferably takes up the form of a microprocessor. Said processing unit 30 implements the method for starting the synchronous motor 1 described hereafter.

The electronic devices 20 according to both of the embodiments have a portion for the synchronisation with the grid 35 that sends the processing unit 30 a grid synchronisation signal 25, i.e. a signal having a unitary value when the voltage of the electrical grid has positive values, zero when it takes on negative values; the timer for controlling the PWM output 33 is advantageously synchronised with the grid synchronisation signal.

Moreover, both of the electronic devices 20 have a portion 36 for feeding the processing unit 30, also arranged to supply said unit with a reference signal for the voltage.

In the first embodiment of FIG. 2, the processing unit 30 has a first input 31, which receives a grid voltage signal 23, and a second input 32, which, on the other hand, receives a voltage signal across the switch 24.

By processing such signals, the processing unit 30 is able to carry out an indirect measurement of the counter electromotive force generated by the synchronous motor 1, obtained as the difference between the grid voltage signal 23 and the voltage signal 24 on the switch, at the moments when the current is zero. The processing unit 30 detects said zero current condition again by evaluating the voltage signal across the switch 24, and in particular ensuring that such a signal is sufficiently far from the zero value.

In the second embodiment of FIG. 3, on the other hand, the electronic device 20 comprises a position sensor 26, in this case a Hall effect sensor, arranged to obtain an angular position signal 27 of the rotor 15.

The position sensor 26 is connected to the processing unit 30 that receives the position signal 27 and, comparing it with the grid synchronisation signal 25, obtains a value of the load angle δ of the synchronous electric motor 1.

The method according to the present invention has two alternative embodiments, the first being able to be implemented with the first embodiment of FIG. 2 of the electronic device 20 (sensorless mode); the second being able to be implemented with the second embodiment of FIG. 3 of the electronic device 20 (sensored mode).

The method according to the sensorless mode comprises a preliminary starting step, briefly described hereafter.

The starting step of the synchronous motor 1 provides a first alignment sub-step aimed at bringing the rotor 15 into a predefined starting position.

In order to obtain this result, the electronic device 20 controls the TRIAC switch 21 so as to feed the windings 11 with a series of current impulses, here called alignment impulses, generated only during a determined half-period, positive or negative according to the selected starting position, of the voltage signal of the electrical grid 22. In application, the TRIAC switch must therefore only be switched on when the grid synchronisation signal 23 takes up a positive value (or negative according to the selected half-period).

Then follows a waiting step to allow the damping of the possible oscillations of the rotor 15.

At the end of the waiting step, it is thus certain that the rotor 15 is stopped in the predefined starting position.

Then begins a starting substep, which provides generating a second series of current impulses of increasing intensity (adjusted by varying the initiation angle α of the TRIAC switch 21), here called starting impulses, this time generated in the half-period of the voltage signal of the electrical grid 22 opposite that of the alignment impulses.

The starting substep is followed by a last substep of transition towards operation at normal speed, which can be started for example by the counter electromotive force signal exceeding a control threshold.

In this last substep, the electronic device 20 controls the motor according to a specific switching on logic that tends to keep the TRIAC switch 21 in conduction only when the transit of current in the windings 11 determines a driving torque in the direction of rotation of the rotor 15.

In particular, the TRIAC switch 21 can be switched on when both of the following conditions occur:

a) the estimated counter electromotive force signal must have the same sign as the grid voltage;

b) the estimated counter electromotive force signal must be going away from zero.

The method according to the sensored mode, on the other hand, carries out the starting of the synchronous motor 1 with the known techniques of starting of motors equipped with a position sensor (described for example in European patent EP0574823)

Once the synchronised condition of the synchronous motor 1 has been reached, the starting is completed and the motor is at steady-state.

Then the actual steady-state control steps of the synchronous motor begin, which once again differs in the sensorless and sensored modes.

In both cases, through the TRIAC switch 21 a partialisation of the voltage of the electrical grid 22 is gradually introduced, according to an initiation angle α controlled in feedback, in order to optimise the performance of the synchronous motor 1.

Figure 4:
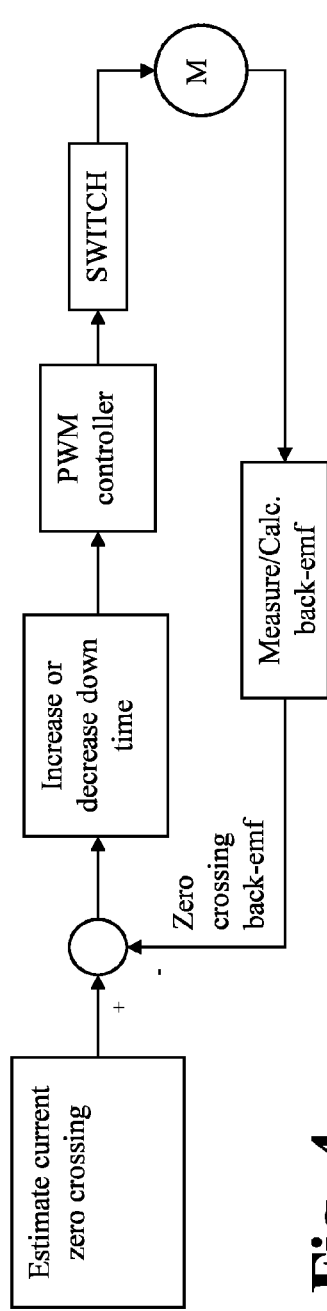
FIG. 4 presents a block diagram that summarily illustrates the various steps of the control method at steady-state according to a first embodiment of the present invention.

In the first embodiment of the method according to the present invention, i.e. in sensorless mode (illustrated by the block diagram of FIG. 4), the control in feedback occurs by identifying as ideal operating condition of the motor the passing through zero of the counter electromotive force function at the half-way point of the zero current plateau set by the closing of the switch 21.

Such a condition corresponds to cancelling the phase shift between the power supply current of the windings and the counter electromotive force generated by the synchronous motor 1, a condition that as known ensures the optimisation of the energy efficiency of the synchronous motor itself (ignoring the losses in the iron).

Thanks to the counter electromotive force signal processed inside it, the processing unit 30 is able to evaluate how the behaviour of the motor differs from the ideal operating condition, consequently correcting the initiation angle α of the TRIAC switch 21 in feedback.

Figure 6:
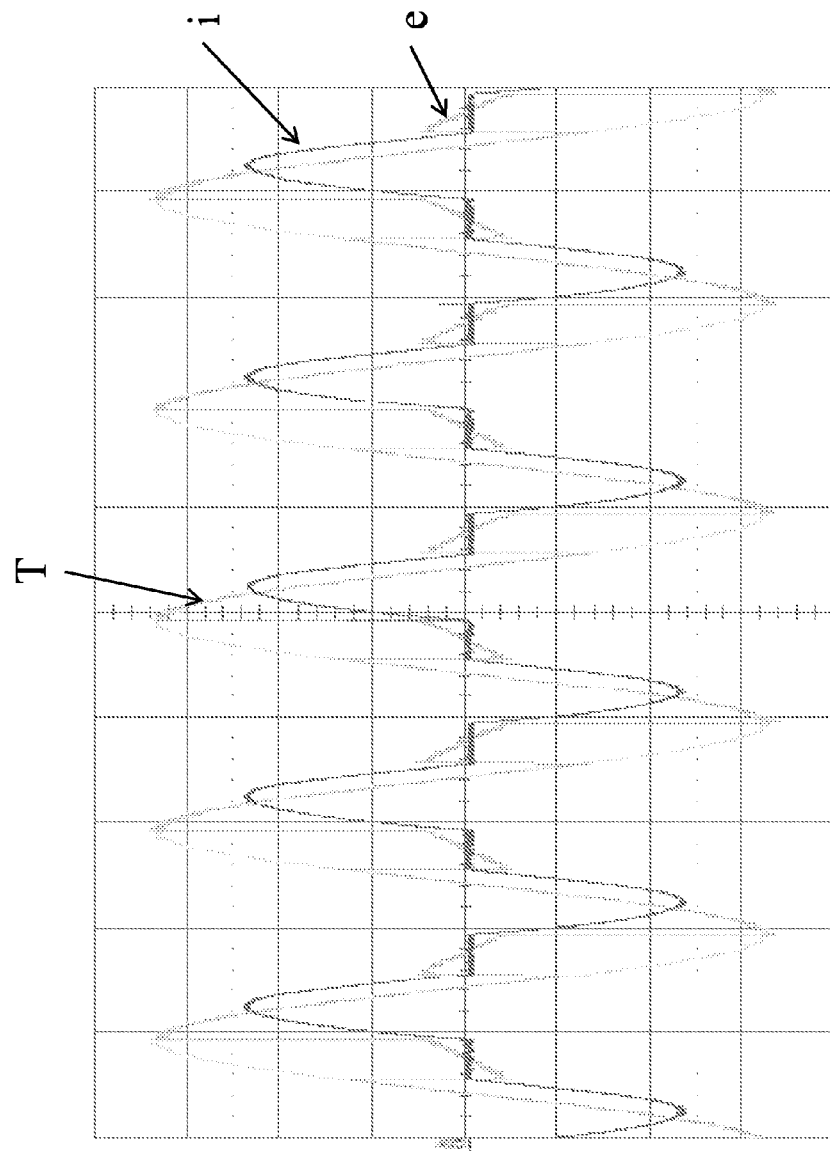
FIG. 6 shows the time profile of some parameters relative to the synchronous motor of FIG. 1 during the control at steady-state carried out with the method of FIG. 4.

FIG. 6 illustrates the time profile of the counter electromotive force and, of the grid voltage T, of the rotation angle of the rotor θ and of the stator current i during normal operation of the synchronous motor 1 controlled in sensorless mode.

Figure 5:
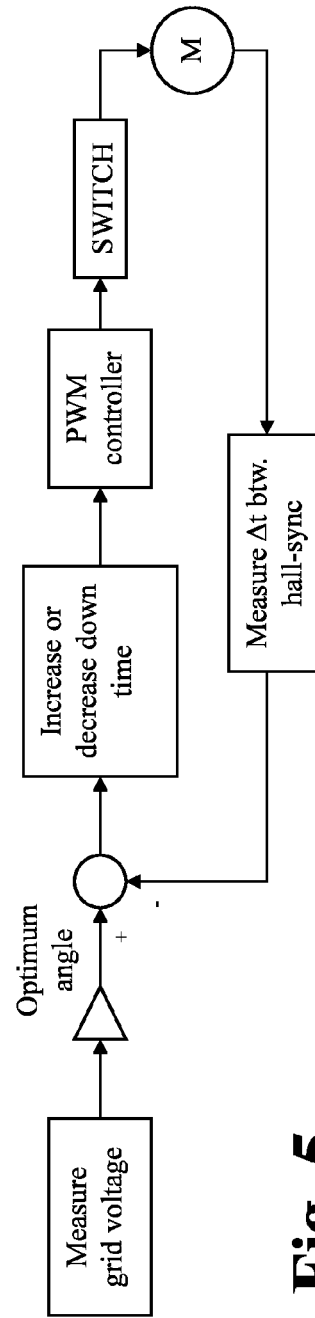
FIG. 5 presents a block diagram that summarily illustrates the various steps of the control method at steady-state according to a second embodiment of the present invention.

In sensored mode, illustrated by the block diagram of FIG. 5, the control in feedback occurs on the value of the load angle δ, setting a reference value $\delta_{opt}$ for it.

In operative terms, the processing unit 30 measures the delay between the front of the position signal 27 and of the grid synchronisation signal 25. Said delay is representative of the load angle δ, for which reason the control tends to bring it to an optimal value $\tau_{opt}$ corresponding to the reference value $\delta_{opt}$. If the measured delay is different from $\tau_{opt}$, the processing unit 30 thus consequently modifies the initiation angle α to follow such a value.

It should be noted that the reference value $\delta_{opt}$ of the load angle and the corresponding optimal value $\tau_{opt}$ of the delay can be set in order to follow the energy optimisation of the motor and the consequent reduction of the vibrations during operation.

The monitoring of the position signal 27 also allows possible pitch losses or shutdowns of the motor to be detected.

FIG. 7 illustrates the time profile of the speed ω, of the torque C, and of the power W absorbed by the synchronous motor 1 during the application of the method in sensorless mode. As can be observed, the progressive introduction of the partialisation of current according to the logic described above promotes a lowering of the power absorbed and an absorption of the oscillations of the speed and torque values (hence a decrease in vibrations).

It should be noted that there is a slight temporal separation between the minimum power and the minimum torque and speed oscillation. Such a separation allows the presumption that the optimal energy efficiency conditions do not coincide with the maximum reduction in vibrations of the motor, and that therefore the control method in sensored mode can alternatively be aimed at optimising efficiency or vibration conditions.

The methods and the devices described above have a series of advantages listed below.

Firstly, and in particular thanks to the use of the PWM output that allows fine adjustment of the delay of switching on of the TRIAC switch (with resolution of a few μs), the methods and the devices described allow a substantial stability of the control and thus of the motor.

In particular, such an aspect ensures good reactivity and precision in response to variation in voltage and charge, which in the example of application of an electric pump can be due to air bubbles or the presence of foreign objects in the desired chamber.

It is also possible to work close to the limit angle beyond which the motor would go out of step, given the reactivity with which it is possible to correct the control.

This involves a further advantage given that, being able to work in optimal conditions on the entire operating voltage range, there is an increased efficiency of the device.

Moreover, given that the control implemented follows the cancelling out of the phase difference between current and counter electromotive force, the system has the advantage of being self-adapting, irrespective of the working point in which the motor is working.

In the example of application of a discharge electric pump, the system follows the energy optimisation irrespective of the installation height of the discharge tube, within the limits predetermined by the manufacturer of the machine.

Of course, a man skilled in the art can bring numerous modifications and variants to the method and washing machine described above, in order to satisfy contingent and specific requirements, all of which are covered by the scope of protection of the invention as defined by the following claims.

The invention claimed is:

1. A method for controlling, at steady-state, a synchronous electric motor comprising a permanent magnet rotor and a stator provided with windings connected to an electrical grid by means of a switch controlled by a processing unit, said method comprising the following steps:

periodically switching on said switch by means of a PWM output of said processing unit;

acquiring a first signal via an input of the processing unit, said first signal indicative of the counter electromotive force generated by the synchronous motor;

acquiring a second signal via another input of the processing unit, said second signal indicative of the current fed to the windings;

continuously checking in the processing unit the phase shift between said first signal and said second signal; and modifying in feedback the switched on period of the switch, and therefore the second signal, toward an ideal operating condition of the motor, wherein said ideal operating condition of the motor is defined as having a zero value of said phase shift, the modification of the switched on period by the PWM output providing a phase control to the motor.

2. The method according to claim 1, wherein in the ideal operating condition of the motor the first signal changes sign at a middle point of a zero current plateau of the second signal.

3. The method according to claim 2, wherein the first signal used to check the phase shift is acquired as the difference between the electrical grid voltage and the voltage across the switch in the periods in which the current fed to the windings is zero.

4. A method for controlling, at steady-state, a synchronous electric motor comprising a permanent magnet rotor and a stator provided with windings connected to an electrical grid by means of a switch controlled by a processing unit, said method comprising the following steps:

periodically switching on said switch by means of a PWM output of said processing unit in order to provide a phase control according to the following steps:

acquiring a first signal via an input of the processing unit, said first signal indicative of the load angle ($\delta$) of the synchronous motor;

continuously checking in the processing unit the shift between said first signal ($\delta$) and a reference value ($\delta_{opt}$) representing an ideal operating condition of the motor wherein said ideal operating condition of the motor is defined as having a zero value of said phase shift; and modifying in feedback the switched on period of the switch via the PWM output, and therefore the first signal, toward said ideal operating condition of the motor.

5. The method according to claim 4, wherein said first signal is obtained by measuring a delay between the front of a position signal of the rotor acquired by a suitable position sensor and a grid synchronisation signal.

6. The method according to claim 4, wherein said reference value (($\delta_{opt}$) for the first signal is calculated so as to achieve energy optimisation and consequent reduction of the vibrations of the synchronous motor.

7. The method according to claim 1, wherein the timer for controlling the PWM output is synchronised with a voltage signal of the electrical grid.

8. An electronic device for controlling, at steady-state, a synchronous motor comprising a processing unit equipped with a PWM output connected to a switch for feeding said synchronous motor, the switch being controlled by said PWM output, said processing unit receiving at least one signal via an input of the processing unit related to an instant operating condition of the motor, said processing unit being arranged to periodically switch on said switch modifying the switched on period in feedback by said PWM output, so as to operate a phase control of said instant operating condition of the motor toward an ideal operating condition of said synchronous motor,wherein said ideal operating condition of the motor is defined as having a zero value of a phase shift of said at least one signal to either a reference value or a second signal.

9. The electronic device according to claim 8, wherein said processing unit receives a grid voltage signal and a voltage signal across the switch and is arranged to calculate the counter electromotive force generated by the synchronous motor from said signals.

10. The electronic device according to claim 8, also comprising a position sensor arranged to obtain a position signal of a rotor of the synchronous motor and send said signal to the processing unit, said processing unit being arranged to obtain a value representative of the load angle ($\delta$) of the synchronous motor from said signal.

11. The electronic device according to claim 8, wherein the switch is a TRIAC switch.

12. The electronic device according to claim 8, comprising a portion for the synchronisation with the grid of the timer for controlling the PWM output.

13. A motor assembly comprising a single-phase synchronous electric motor using permanent magnets and an electronic control device according to claim 8.

* * * * *